MAGNETIC FILM DEVICE

Filed May 5, 1965 2 Sheets-Sheet 1

INVENTORS
BARRY L. FLUR
PIETER D. DAVIDSE
LEON I. MAISSEL

BY

ATTORNEY

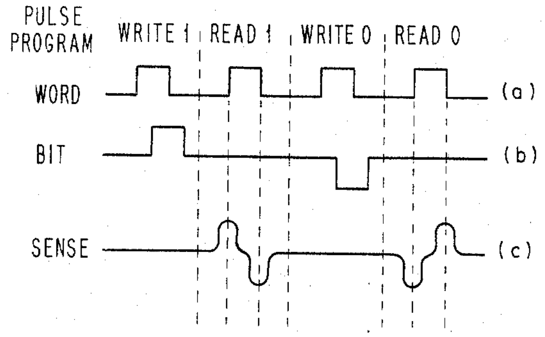
FIG. 3
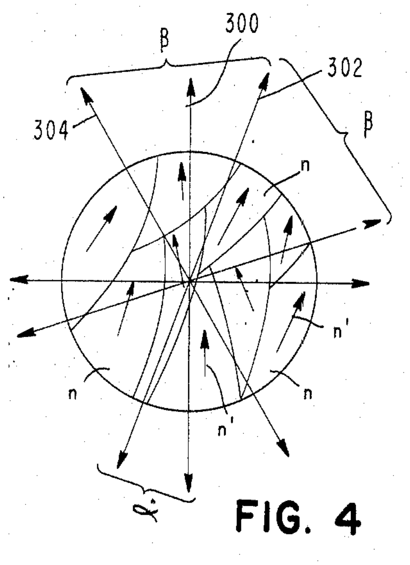
FIG. 4
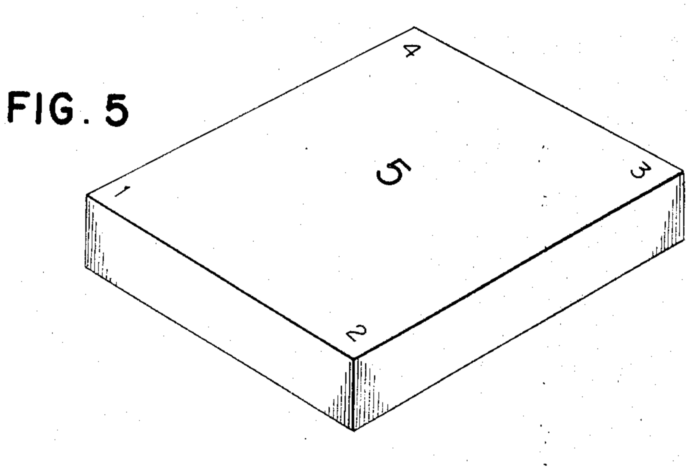
FIG. 5
FIG. 6
| | | $H_0$ | $H_{K0}$ | β | α |
|---|---|---|---|---|---|
| a | 1 | 2.1 | 2.5 | 5° | +0.3° |
| | 2 | 2.1 | 2.4 | 5° | +0.1° |
| | 3 | 2.1 | 2.5 | 5° | +0.1° |
| | 4 | 2.0 | 2.6 | 6° | +0.3° |
| | 5 | 2.2 | 2.7 | 5° | +0.2° |
| b | 1 | 2.0 | 2.6 | 5° | 0 |
| | 2 | 2.0 | 2.5 | 5° | +0.7° |
| | 3 | 2.1 | 2.6 | 5° | +0.3° |
| | 4 | 2.0 | 2.5 | 5° | +0.3° |
| | 5 | 2.0 | 2.6 | 4° | +0.4° |
| c | 1 | 4.1 | 3.4 | 8° | +1.2° |
| | 2 | 4.0 | 3.0 | 8° | +0.5° |
| | 3 | 3.9 | 3.1 | 8° | +0.3° |
| | 4 | 4.0 | 3.1 | 7° | -2.0° |
| | 5 | 4.0 | 3.2 | 7° | +0.3° |

United States Patent Office 3,480,922
Patented Nov. 25, 1969

3,480,922

MAGNETIC FILM DEVICE

Barry L. Flur, Pieter D. Davidse, and Leon I. Maissel, Poughkeepsie, N.Y., assignors to International Business Machines Corporation, Armonk, N.Y., a corporation of New York Filed May 5, 1965, Ser. No. 453,396
Int. Cl. G11b 5/62
U.S. Cl. 340—174 7 Claims

ABSTRACT OF THE DISCLOSURE

A magnetic film device wherein a dielectric film that is the product of a radio frequency sputtering process is disposed between the magnetic film and its supporting substrate. The use of a radio frequency sputtered dielectric film layer in place of the vacuum evaporated dielectric layers conventionally employed in magnetic films gives a high degree of uniformity to the magnetic film devices thus produced.

This invention relates to magnetic thin films and, in particular, to an improved magnetic thin film device, and, to the process for producing the same.

A variety of magnetic thin film devices, including storage elements, parametrons, delay lines and logic elements, have attracted the attention of both the scientific and industrial communities. Such devices offer both engineering and commercial advantages over present devices used as components in computer and data processing machines.

Based on estimated market ability and the anticipated problems of manufacture, by far the most promising of these devices is the simple bistable storage element first proposed by both M. S. Blois in The Journal of Applied Physics, vol. 26, 975 (1955), and by R. L. Conger, Physical Review, vol. 98, 1752 (1955). Such films are usually prepared from 80:20 by weight nickel-iron in the presence of a magnetic field that is applied to induce a uniaxial anisotropy in the film. With that anisotropy, an easy axis of magnetization is aligned parallel to the direction of the externally applied field, along which axis two stable states corresponding to positive and negative states are found.

The advantages of the magnetic thin film holds promise of commercial realization in magnetic storage applications. In such a storage device, a network of drive lines is inductively coupled to each of the magnetic thin film bit elements, a bit being used to designate a storage site. The network includes two sets of drive lines, with each of the members of each set being parallel to the other members of the same set. One of the sets is disposed parallel to the easy axis of the magnetic film and the second set is placed in quadrature to the first set; both sets are inductively coupled to the film. The network takes the form of a lattice or matrix, containing longitudinal and lateral coordinates, with the bits being located in those regions wherever a member from the second set of drive lines is transverse to a member of the first set. Rotation of the magnetization is brought about by activating selected members from the drive lines of both sets; interrogation of information is performed by activating selected drive lines of one set, to induce a field which is oriented to partially rotate the magnetization from the easy axis, which rotation is detected as a voltage response. With sensing equipment coupled to the film, reorientation of the magnetization from one stable state to the other in a thin film is accomplished in relatively short periods of time, in comparison to other storage devices, and is in the order of nanoseconds (10–9 seconds).

But the resultant properties and degree of reliability recognized with a magnetic thin film storage device are dictated to a great extent, if not entirely, by a number of considerations external to the film itself. A rather important factor in this regard is the substrate, the primary function being that of a mechanical support for the film, and, secondarily, providing an electrical function. The substrate material and its crystallographic state (that is, whether it is amorphous, polycrystalline, or a single crystal), the substrate surface topography, and profile, and the surface contaminations, are of particular significance and play a dominant role in determining the resultant magnetic device properties. While all the mechanisms and phenomena which take place on the substrate surface to influence the resulting magnetic properties of the thin film are not fully understood, a working hypothesis based upon theoretical and experimental considerations has been advanced. What is found is that surface roughness of the substrate on a microscopic scale, appears as a nonuniform distribution of hills and valleys which gives rise to local demagnetizing fields. Further, the substate roughness affects the film growth by the subtle transfer of crystalline properties by the process of epitaxy. But since the substrate surface has a nonuniform profile, the crystallographic relationship between substrate and film is different from region to region, thereby bringing into play varying localized anisotropy forces. Normally greater substrate roughness results in higher coerceive force, skew, and dispersion, and greater scatter in values of these parameters over the magnetic film. High values and a large spread in magnitude of magnetic parameters over the surface of a film adversely affect power requirements, reliability, and cost, resulting in an inoperable device or one that is not commercially competitive with other storage media.

Various approaches have been taken in attacking this problem. Initially, glass substrates were used since glass offers a smooth surface in comparison to other materials. An additional degree of smoothness, it was later discovered, is obtained by depositing silicon monoxide film over the glass surface, prior to disposing the magnetic thin film thereon. Then, in the search for greater compactness, emphasis was shifted to metal substrates, and use made of the substrate as return path for the drive lines, which offers gains over line impedance, current to field conversion, and noise. But, in order to abate the affect the metal substrate surface has on the magnetic properties, both elaborate polishing and the silicon monoxide precoat are required. Now, while the silicon monoxide precoat substantially lessens the adverse affects the substrate surface has on the magnetic thin film, the precoat now gives rise to several ancillary factors that prevent the complete development of the desired properties on the film. These ancillary factors are an outgrowth, it appears, from the large thermal mismatch between the dielectric and the metal, the dependence of skew on the angle of incidence of deposition of the silicon monoxide, and the highly stressed state into which the silicon monoxide develops upon condensation. Accordingly, it has been an object of considerable research, therefore, to provide a magnetic thin film device that overcomes these heretofore mentioned prior art problems.

Accordingly, it is a primary object of this invention to provide an improved magnetic thin film device.

It is a further object of this invention to provide an improved magnetic thin film device having uniformity of magnetic properties over the surface thereof and which offers a range of magnetic properties that are predictably built into the device.

It is yet another object of this invention to provide an improved process for making a magnetic thin film storage device.

It is still a further object of this invention to provide an improved magnetic thin film storage device wherein the surface effects of the substrate are reduced to a tolerable level.

It is still a further object of this invention to provide an improved process for making a magnetic thin film storage device at commercially and economically acceptable yields.

What has been discovered is that the aforementioned objects, features and advantages are obtained, in accordance with the present invention, with a magnetic thin film storage device wherein a dielectric layer that is the product of a high frequency excitation sputtering process is disposed intermediate the substrate and magnetic thin film. With such a dielectric film, the advantages over the substrate roughness are recognized without the attendant disadvantages that are associated with prior art precoats. Substrate surface crystalline anisotropy contributions are overshadowed or reduced to a level heretofore not achieved in the art. The magnetic parameters of anisotropy fields, coercive force, dispersion and skew are produced with a degree of uniformity and reproducibility, from region to region in the magnetic film, heretofore not available in the art. Several reasons may be advanced to explain the superiority of the high frequency excitation sputtered dielectric film as the intermediary between the magnetic film and substrate surface. What is suggested, from both a theoretical and analytical consideration, is the elimination or the substantial attenuation of the problems that arise from thermal mismatch, angle of incidence of deposition, and internal stress of the dielectric film, all of which are substantial adverse factors associated with prior art precoats. Thus, the dielectric precoat in accordance with the present invention affords a degree of control, regulation and predictability over device parameters that is not attainable with prior art precoats and processes.

Accompanying these heretofore mentioned substantial improvements in the magnetic thin film storage device are additional features that emanate from the process, in accordance with the invention, that promote economic and commercial attractiveness as well as lead to further improvements in the device. Metal substrates, as heretofore discussed, in the as-received condition, have a surface profile, in most cases, that lacks the finish required for substrate use, and fabrication procedures, as a result, include elaborate surface polishing treatments in order to assure the desired mirror finish. Now, with a dielectirc film that is deposited on the substrate by the high frequency excitation sputtering process, in accordance with the present invention, the substrate surface requirements are eased, affording a relaxation in the polishing procedure, if not completely dispensing with the necessity of the same. A metal substrate in its as-received condition from a metal working process such as rolling, stamping, cutting, or the like, may forego the traditional polishing procedures, facilitating the conditioning of the substrate, and, receive the intermediary films directly, reducing the stringency of the pretreatment requirements, if not completely circumventing their use, promoting predictability of the device properties and generally advancing fabrication control. Accordingly, the present invention provides a magnetic thin film storage device with a unique combination of operational, structural, as well as processing techniques heretofore not known in the art.

The foregoing and other objects, features and advantages of the invention will be apparent from the following more particular description of preferred embodiments of the invention as illustrated in the accompanying drawings.

In the drawings:

FIG. 3 is a typical pulse program utilized in the operation of the magnetic device of FIG. 2.

FIG. 4 is a schematic representation of the microscopic variance of the magnetization vector from the intended easy direction of magnetization to illustrate skew and dispersion.

FIG. 5 is a schematic 5 x 5 centimeter square film with the numerals thereon depicting the regions in which the magnetic properties of the magnetic thin film device were measured to evaluate uniformity of properties and control of the magnetic parameters as given in FIG. 6.

FIGS. 6*a* and 6*b* present the magnetic parameters of coercive force, anisotropy field, dispersion and skew taken on a magnetic device which includes a high frequency excitation sputtered dielectric underlayer.

FIG. 6*c* presents the magnetic parameters of coercive force, anisotropy field, dispersion and skew for a magnetic device where the magnetic thin film was deposited over a layer of silicon monoxide.

Figure 2:
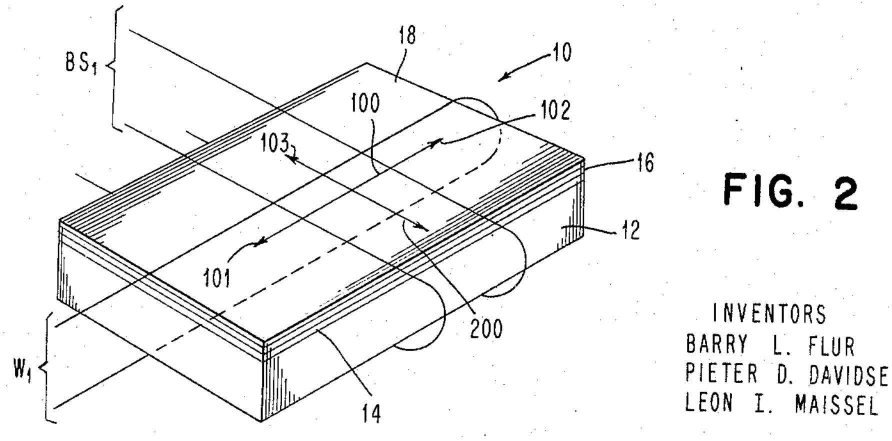
FIG. 2 is a schematic representation of a magnetic thin film device in accordance with the invention.

Now, speaking generally as to the magnetic thin film device in accordance with the present invention, reference is made to FIG. 2. There one storage cell, generally depicted as numeral 10, is presented. Of course, it is to be realized that such a magnetic device may form a series of these storage cells which are arranged in rows and columns. Associated with the magnetic device 10 is a word line $W_1$ and the common-bit sense line $BS_1$, which are disposed in such a manner that the drive lines $W_1$ and $BS_1$ are substantially in quadrature one to the other. Bit cell 10 includes a base portion 12 which may be a dielectric, such as glass or mica, but preferably a conductive material, such as metal. Metal is preferred since it serves as the ground return for the line $W_1$ and $BS_1$ thereby attaining closer inductive coupling for the device. Over base 12 adhesive layer 14 is deposited which is formed from an oxide forming metal, where the metal oxide is of type that is compatible with glass, such as chromium, tantalum, niobium or molybdenum; the particular metal used as the adhesive is not critical, provided it furnishes the necessary nuclei and bonding fields for the adhesion of the sputtered dielectric layer to the substrate.

Superimposed over the adhesive layer 14 is the sputtered dielectric film 16. That film is sputtered at high frequencies to a thickness of about $25 \times 10^3$ Angstroms and the particular apparatus and process for sputtering the dielectric at high frequency is the subject of copending patent application Ser. No. 428,733 of Davidse and Maissel, filed Jan. 28, 1965, and now U.S. Patent No. 3,369,991, and which patent application is assigned to the assignee of the instant application. The details of the high frequency sputtering are reviewed in more detail hereafter.

Magnetic film 18 and drive lines $W_1$ and $BS_1$ complete the device. Arrow 100 in the device represents the easy direction of magnetization and drive line $W_1$ is parallel to this axis $W_1$; arrow 200 represents the hard axis which the drive lines $BS_1$ are parallel to. Or, in other words, the drive lines $BS_1$ are transverse to the easy axis 100. Bit cell 10 is word organized with the word lines $W_1$, upon activation, furnishing a field transverse to the easy direction of magnetization of sufficient magnitude to rotate the magnetization 90° from the easy axis, while bit sense lines $BS_1$, upon activation, produce a field parallel to the easy axis 100. Now, to facilitate the discussion of the more specific aspects of the inventive contribution, the discussion is turned to a description of the method of fabrication, in accordance with the invention, with the aid of the various schematic figures shown in the drawings. It is to be understood, however, that the details given therein are in no way restrictive and that the figures as well as the components used may be modified to a wide extent without departing from the scope of the invention.

Now, with reference to FIG. 2, the method for producing a magnetic thin film storage device exhibiting reproducible and stable properties within predescribed tolerances is presented, with the different steps of the method being successively explained. Substrate 12 (or base plate) is an electrically conductive nonferromagnetic metallic sheet or plate. The thickness of the plate is not critical—it should, however, have sufficient thickness to maintain mechanical resistance for self-support. Where silver-copper plates are used as substrates, thicknesses of approximately 80 mils are found suitable. Of course, other metals are employable as the substrate material, but, since the substrate also functions as the return path of the drive lines, the selection of substrate materials is preferably limited to those metals that exhibit good electrical conductivity. Included in such a group are copper, gold, silver, aluminum, molybdenum or the like.

Disposed over the substrate surface 12 is a thin metallic layer 14 of tantalum. The tantalum was cathodically sputtered in a vacuum of $7\times10^{-2}$ torr in an argon atmosphere by conventional sputtering techniques. The sputtering process included a two minute cleaning of the substrate, with a potential between substrate and the grounded anode of 1700 volts and a current of 20 milliamperes. Layer 14 was then grown to a thickness of about 17 microns, after this, by impressing a potential of 3300 volts between cathode and anode with a current of 420 milliamperes.

The requirements for the metal of layer 14 are that the metal is of the class that adheres to the substrate and forms a superficial oxide of the type that is compatible with glass. The layer may be thought of as fulfilling the functions of an adhesive: the subsequent layers that are deposited require this vehicle in order to adhere to the substrate, where the substrate is of the class that does not form an oxide compatible with the dielectric. In addition to wetting the substrate and joining the dielectric thereto, the layer 14 metal, that is used, has a recrystallization temperature that is above the deposition temperature of the succeeding layers, a low partial pressure of vaporization, and exhibits chemical stability other than forming the superficial oxide layer heretofore discussed. A variety of metals are available for this purpose and include chromium, niobium, molybdenum, titanium and the like. Further, the process of formation is not critical and is not limited to sputtering, as heretofore described, but vapor deposition, electroplating, chemical reduction processes, or the like, are other techniques for placing metal layer 14 over the substrate surface.

Layer 14 is circumvented, in accordance with the present invention, if preferred, by a judicious choice of the substrate metal. In the example heretofore described, the substrate metal is a silver-copper plate which requires the supplementary bonding vehicle but, with a substrate material such as molybdenum, the dielectric layer that is subsequently deposited adheres directly to the substrate and dispenses with the requirement for an adhesive layer. But based on a number of other considerations, including availability of the metal, ease of working and the economics involved, silver-copper was used as the substrate in the case under discussion.

Figure 1:
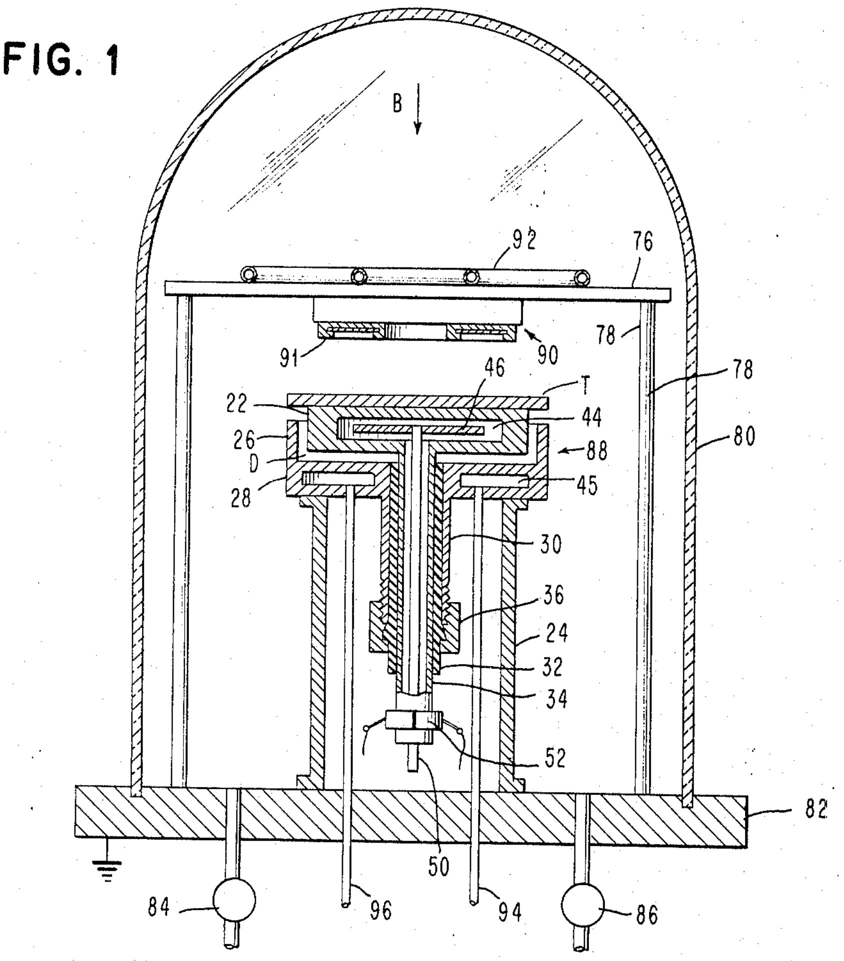
FIG. 1 is a schematic representation of the sputtering apparatus utilized in the preparation of the dielectric underlayer for the magnetic thin film device of the present invention.

Deposited over layer 14 is the high frequency excitation sputtered dielectric film 16. That film is deposited in an apparatus such as that depicted in FIG. 1. The high frequency sputtering apparatus includes a low pressure gas ionization chamber enclosed by envelope 80, which is in the form of a bell jar made of a suitable material such as glass, and is removably mounted on base plate 82. Before sputtering is initiated, the chamber is pumped down to a pressure of about $1\times10^{-5}$ torr by means of vacuum pump 86. The bombarding medium for removing the dielectric particles as the sputtered product is supplied by way of port 84, and, in the particular example herein described, the medium was argon which was injected to a pressure of about $1\times10^{-2}$ torr. Positioned within the envelope 80 are two electrodes which are designated cathode structure 88 and anode structure 90 for purposes of identification.

In a high frequency excitation sputtering process, the terms cathode and anode, it will be readily recognized, are merely terms of convenience rather than of function, inasmuch as the sputtering apparatus is activated by a radio frequency power source. The portions of the apparatus respectively identified as cathode and anode function as both, for the radio frequency excitation includes two half-cycles each of opposite polarity. Accordingly, for one half-cycle, the cathode is at a negative potential with respect to the anode, while during the next half-cycle, the cathode is actually positive with respect to the anode. However, because the electron mobility is much larger than the ion mobility and because the net DC current to the dielectric target must be zero, the surface of the dielectric target will self-bias negatively with respect to the plasma. This is more fully described hereafter.

The RF sputtered layer 16 is formed from target T. High frequency excitation sputtering is hereafter designated RF sputtering for simplification of terminology. The target T, the dielectric material that is to undergo sputtering, is mounted on the electrode 22 which is indirectly supported by, while being insulated therefrom, a hollow supporting column 24, the bottom flanged portion being secured to the base plate 82. Column 24 is electrically conductive and is in direct electrical contact with the base plate 82 which is grounded, as indicated in the drawing. Thus, column 24 is at ground potential. Supported on the upper flanged end of the cylindrical column 24 is metallic shield 26 having an upwardly extending annular portion 28 that partially encloses the electrode 22 adjoining the target. A cylindrical metal sleeve 30 is secured to and depends from the lower face of the shield 26 in concentric relation to the cylindrical column 24 which encloses it. Within sleeve 30 is disposed a narrower sleeve 32 of suitable insulating material, such as Teflon, which extends upwardly into a central aperture in the shield member 26. Metal tube 34 extends vertically through the insulated sleeve 32 and is frictionally held in its vertical position by sleeve 32. A ferrule or bushing 36 engaged with a projecting annular portion of sleeve 32 is fastened to the outer surface of sleeve 30 and, with the ferrule 36 tightened, a firm frictional engagement is maintained among the parts 30, 32 and 34 whereby the tube 34 is effectively supported along the vertical axis of the column 24 while being electrically insulated therefrom. The upper and lower flanges of the column 24 have airtight seals with shield 26 and base plate 82, respectively, and the insulating sleeve or gasket 32 maintains an airtight seal between tube 34 and shield 26. Thus, the interior of column 24 is sealed from the space surrounding the column 24, which is part of the low pressure gas chamber. The interior of column 24 is at normal air pressure.

The electrode 22 is supported on the upper end of vertical tube 34 and electrode 22 is generally disk shaped. To insure a uniform cooling action, a disk shaped baffle member 46 is disposed within space 22. Baffle 46 has a central opening that communicates with the upper end of a vertical tube 50 of small diameter that extends through the interior of the tube 34 in coaxial relation therewith. The lower end of tube 34 extends into metal bushing or sleeve 52 with which it has a tight fit. In operation, water or other cooling fluid is injected through the outer tube 34. The water circulates around the baffle 46 within space 44 inside electrode 22 and then leaves through the exit portion 50, thereby cooling the electrode 22 and the target T mounted thereon. This helps to prevent excessive deterioration and sagging of the target. Where water or any other electrically conductive cooling fluid is used, the inlet and outlet for the water are respectively connected to source by means of a long plastic or rubber tubing, thus creating a high resistance path to ground. With 15 feet of ¼ inch I.D. tubing, a resistance to ground of 10 megohms is obtained and substantially no power is lost to ground. Similarly, in shield 26, base 42 and annular lip 40 are secured to each other and enclose central space 45 within which water or other cooling fluid is circulated by way of inlet conduit 94 and outlet conduit 96.

The voltage is applied to the electrode from a radio frequency source (not shown). The electrical connection is made through bushing 52 and tube 34 to electrode 22. As previously indicated, tube 34 is electrically insulated from the shield 26. Ground potential is maintained on a shield 26 by virtue of the fact that the shield is electrically connected to the supporting post 24 which is mounted on the ground base plate 82. The grounded shield 26 serves to suppress a glow discharge that otherwise might take place between the target T in the vicinity of the target electrode 22.

The shape of the shield 26 and the spacing from the electrode 22 are important factors. Lip 28 of shield 26 does not project upwardly past electrode 22 nor does target is bombarded by the ions in the sheath, atomic particles of target material are sputtered off and deposited upon the substrate carried by holder 91 fastened to the counterelectrode or anode 90. The arrangement is such that very little of the sputtered dielectric material is deposited elsewhere.

During the sputtering process, use is made of a magnetic field to enhance the glow discharge ionization action. Field B is applied transverse to the plane of the target surface. The effect of a magnetic field on the ionization action of a glow discharge is well known in the art, but, in addition to what is expected, the presence of the magnetic field appears to facilitate the tuning of the radio frequency power source and the matching of the same to the load under the operating conditions. The magnetic field is maintained between 70 to 110 gausses in the apparatus described.

In the RF sputtering of the dielectric film 16 for magnetic device of FIG. 2, the RF cathode has a diameter of about 7 inches and the target a thickness of about ⅛ inch. Although a number of dielectric materials are amenable to the process and yield good results on the film, among which are found borosilicates, lead borosilicates, calcium aluminosilicate and quartz glasses. In the particular example under discussion the glass was Pyrex 7740: that glass has a composition in weight percent of 80.7 $SiO_2$, 3.8 $Na_2O$, 2.2 $Al_2O_3$, 0.4 $K_2O$ and 12.9 $B_2O_3$. The anode is about 12 x 12 inches. For convenience, the Federal Communication Commission's Industrial Scientific and Medical Equipment designated frequency of 13.56 megacycles is used, but any excitation high frequency is usable, although between 5 to 27 megacycles is preferable. The power input and electrode potential was regulated as brought out in the Table I below.

TABLE I

| Run No. | Substrate No. | Target Material | Target Dia. (inch) | Primary Power (kw.) | Electrode Potential (pk-pk volt) | Deposition Rate (A./min.) | Substrate Temp. |
|---|---|---|---|---|---|---|---|
| 100 | D709 | Pyrex 7740 | 7½ | 1.36 | 900 | 210 | Cooled. |
| 101 | D510 | do | 7½ | 1.38 | 900 | 210 | Do. |

it project laterally beyond the outer edge of the target T. In addition, space D between the shield 26 and electrode 22 is maintained within predescribed limits. In particular, the upper limits of space D should not be greater than the thickness of the Crookes dark space in the glow discharge.

The plate 12, with tantalum layer 14 thereon, is secured in suitable holders 91 and positioned on the underside of anode 18. That, in turn, is mounted on the underside of plate 76 which is supported by posts 78; anode 90 is in spaced parallel relationship to the target T. Cooling coils 92 are placed above plate 76 to provide cooling of the anode 90. With radio frequency voltages applied to the electrode 22, target T functions as an RF electrode in those half-cycles when a potential of the electrode is negative with respect to ground. During the intervening positive half-cycle the potential of electrode 22 rises slightly above ground level thereby attracting electrons to the target T for removing the positive charge previously placed on target T by bombarding ions. Electrons are attracted to the target T in far greater numbers than the heavier ions, but since target T is dielectric and electrode 22 is well shielded, no direct current flows through RF cathode structure 88. As a result the interaction of the ions and electrons, the target T maintains itself at a generally negative potential with respect to ground, and if it does momentarily require a positive potential, it is not sufficient to reverse the sputtering process and cause undersize sputtering of any metal parts associated with the RF anode structure.

Establishment of a glow discharge at radio frequency between the target T and the anode 90 causes a positive ion sheath to form around the negative target T. As the Table I above presents in sequence: the sample numbers, substrate designation, target material used, the diameter of the target material, the primary power in kilowatts, the electrode potential in peak to peak voltage, the rate of deposition in Angstroms per minute, and the condition of the substrate during the process. The dielectric film under the conditions given was grown to a thickness of about 2.5 microns.

The ferromagnetic thin film 18 is then deposited over the face of dielectric film 16 by one of the several conventional techniques. The magnetic film is evaporated in a vacuum chamber with the pressure reduced therein to the order of $10^{-5}$ to $10^{-4}$ torr and vacuum deposited on the substrate. Substrate temperature control is used to assure the development of uniform properties on the surface of the film. The thickness of the layer is usually between 700 to 1000 A. but may vary in accordance with the properties desired. Uniaxial anisotropy is developed in the film, during the course of the vacuum evaporation, with a Helmholtz coil positioned to produce a field in the direction of the desired anisotropy. The magnetic thin film is of the Permalloy type containing from 55% to 85% by weight nickel, with the balance iron. Part of the nickel, up to about 10% by weight, is replaceable with a metal such as molybdenum, cobalt, palladium or the like.

While the magnetic thin film deposited by vacuum deposition on the RF sputtered dielectric film exhibits improved properties in comparison to that available with prior art dielectric layers, even further improvements in the device are available when the magnetic thin film is cathodically sputtered onto the dielectric film. A process which is available for this is that which is the subject of United States Patent Application Ser. No. 402,800, filed Oct. 9, 1964, and now U.S. Patent No. 3,303,116, which patent application is assigned to the assignee of the instant application. With this cathode sputtering process, the advantages of that process are superimposed upon those of the instant invention, thereby yielding a product, from a process, in which the parameters are controllable to produce a wide spectrum of predetermined magnetic properties.

The drive lines $W_1$ and $BS_1$ which supply the fields for the storage and reading of the intelligence are placed over the magnetic films, thereby completing the drive. While FIG. 2 shows $W_1$ and $BS_1$ as lines, in practice, printed circuits formed on polymeric backings, such as polyester terephthalate, are used. Other alternatives are available and are well known in the art: the magnetic thin film 18 is coated with an insulating material such as dielectric material 16. Conventional masking procedures are employed to outline the desired drive line pattern over the insulative film. Thereafter the drive lines are deposited on the film. Other drive lines, as required, are then superimposed over the first set with the necessary insulating films, intermediary the drive lines.

The operation of the magnetic storage film device entails the use of fields produced by both the $W_1$ and $BS_1$ line. With the remanent magnetization representing stored data oriented along the easy axis 100 with the direction of the magnetic dipoles toward site 101, electrical pulses transmitted along drive line $W_1$ produce a field that rotates the magnetization from site 101 of the easy axis 100 toward site 103 of the hard axis. With the transmission of electrical signals along drive line $BS_1$, the vector summation of the fields of both $W_1$ and $BS_1$ then rotate the dipoles toward site 102 or site 101 of easy axis 100, the direction taken depending upon the polarity of the field excited by $BS_1$. The binary nomenclature, that is 1's and 0's, is a function of the direction that the magnetic dipoles assume along the easy axis.

To interrogate the intelligence recorded along the easy axis of the magnetic thin film storage device 10, drive line $W_1$ is activated. The electrical pulses transmitted thereon produce a field that causes the magnetic dipoles to rotate from the easy axis toward the hard axis, and associated with the rotation of these magnetic dipoles is an induced voltage, the polarity of which is determined from the position the magnetic dipoles had prior to disturbance by the word line field: the magnetic dipoles originally oriented toward site 101 of the easy axis 100 rotate in a clockwise direction, whereas the magnetic dipoles oriented originally toward site 102 rotate in a counterclockwise direction.

This is further illustrated with reference to FIG. 3 of the drawings where a typical pulse program for writing and reading binary intelligence in magnetic storage device 10 is illustrated. For purposes of explanation site 101 direction of the easy axis 100 is desigated the binary 0 and site 102 the binary 1. With the magnetic dipoles oriented toward site 101, a binary 1 is written with the pulse program such as that illustrated under "Write 1" of FIG. 3. The word line is activated and during the period that the electrical pulse is rising, the magnetic dipoles rotate toward the hard axis and produce a voltage of one polarity in the sensing equipment. This is brought out in FIG. 3. After the activation of the word line, a positive bit pulse is then transmitted along the $BS_1$ drive line. Once the bit pulse has developed, the word drive line is deactivated and the field produced by the bit pulse completes the rotation of the magnetic dipoles, which in the case assumed, is toward site 102 of the easy axis 100. Now to store a binary 0, the pulse program of "Write 0" of FIG. 3 is used. As with the binary 1, the word line is again activated before the bit line and with the same polarity as in the previous case. Thereafter, the bit pulse is transmitted along $BS_1$ but, in this instance, the polarity of the bit pulse is opposite to that used for the storage of the binary 1. Upon removal of the word field, the bit field, which is of a different polarity than that of the previous case, completes the rotation of the magnetic dipoles to site 101 of the easy axis. The requirements for the bit pulse are that the pulse be large enough to assure complete rotation to the right or left of the hard axis but small enough not to disturb bits on other word lines. In principle, there is no upper limit to the magnitude of the word pulse but in practice limitations are counted from adjacent bit interaction.

That the magnetic storage device formed in accordance with the present invention offers a unique combination of magnetic properties with a high degree of uniformity and control, heretofore not available, is brought out by the data in FIG. 6 and that of Table II that hereafter follows. It will be noted that the data presents the magnetic parameters of coercive force $H_0$, anisotropy field $H_{k0}$, dispersion $\beta$, and skew $\alpha$ which are of particular significance in the evaluation of a magnetic thin film storage device. These terms are well known in the art and widely described in the literature. For example, see H. J. Kump, "The Anisotropy Fields in Angular Dispersion of Permalloy Films," 1963 Proceedings of the International Conference on Non-Linear Magnetics, Article 12–5. But, to facilitate the discussion at hand, the terminology is briefly reviewed.

$H_0$: Coercive force is a measure of the easy direction field necessary to start a domain wall in motion, a threshold for wall motion switching.

$H_{k0}$: Anisotropy field may be thought of as the force required to rotate the magnetization from its preferred direction of magnetization to the hard direction and $H_{k0}$ is the anisotropy field as viewed on a microscopic scale.

$\beta$: Dispersion is conveniently defined with reference to FIG. 4 which shows a section of a magnetic thin film, as comprising the aggregate of microscopic magnetic regions $n$. Associated with each of the microscopic magnetic regions $n$ is a magnetization vector $n'$. Under ideal conditions, each of the magnetization vectors $n'$, related to a microscopic magnetic region $n$ is parallel one to the other with the vector summation thereof yielding the intended easy direction of magnetization depicted as arrow 300. But, owing to various imperfections and fabrication difficulties, some of which are hereafter discussed, the intended easy direction of magnetization, arrow 300, is not achieved. The mathematical mean of the magnetization vectors $n'$ gives rise to a mean easy direction of magnetization designated arrow 302, and the angle $\beta$ between the intended easy direction, arrow 300, and the mean easy direction, arrow 302, is skew, which is more fully discussed below. Now, the angle in which we find 90% of the microscopic magnetization vectors $n'$ of the microscopic magnetic regions $n$ is dispersion, and that angle $\beta$ is graphically illustrated in FIG. 4 as the angle between the mean easy axis, arrow 302, and the boundary line, arrow 304, which includes 90% of the deviations of the magnetization vector $n'$ from the intended easy axis of magnetization arrow 300. Measurement of dispersion is similar to that discussed in the article by T. S. Crowther, entitled "Techniques for Measuring the Angular Dispersion of the Easy Axis of Magnetic Film" Group Report #51–2, M.I.T. Lincoln Lab, Lexington, Mass. (1959).

$\alpha$: Skew is defined heretofore with reference to FIG. 4 It comes about as a result of the average of the local dispersions of the easy direction, in the individual magnetic regions. The summation of these local dispersions yields an externally discernible average easy direction for the entire film which is designated $\alpha$, the angle between the actual easy axis 302 and the intended easy axis 300. Skew may be thought of as the macroscopic deviation of easy direction of magnetization from the desired reference while dispersion is as the microscopic deviation. Various causes have been given for the variation from the intended easy axis: inhomogenities of the magnetic field used to impart the desired anisotropy, magnetostrictive effects, stresses and strains developed during the deposition, substrate surface scratches, and temperature gradients. With the present invention, low values of skew $\alpha$ and dispersion $\beta$ are obtained.

Quasistatic magnetic measurements of the wall motion threshold $H_0$, anisotropy field $H_{k0}$, dispersion of the easy axis and skew were made with a 60-cycle Kerr-effect loop tracer having a light-spot dimension of less than 2 microns in diameter. Measurements were taken at the centers and four edges of each specimen as brought out by FIG. 5 of the drawings.

FIG. 6 of the drawings presents a ready comparison of the magnetic properties obtained with an RF sputtered film intermediate the magnetic film and substrate, to that obtained with a magnetic storage device utilizing the conventional evaporated silicon monoxide film therebetween. FIGS 6*a* and 6*b* refer to the magnetic storage device in accordance with the invention, while FIG. 6*c* refers to the storage device utilizing the silicon monoxide layer. The above shows that the magnetic storage device with the RF sputtered dielectric film is characterized by lower coercive force $H_0$, anisotropy field $H_{k0}$, dispersion $\beta$, and skew $\alpha$. The degree of uniformity now available for all properties with the RF sputtered film and, in particular, with dispersion and skew, enhances reliability and lower power requirements. Device performance is generally superior to that previously known or expected in the art.

Improvement in uniformity, control and predictability over device performance is further appreciated with a comparison of the magnetic characteristics of a storage device in accordance with the present invention, to that of a device which was formed by depositing Permalloy directly onto a glass substrate which is presented in Table II.

TABLE II

| $H_0$ | $H_{k0}$ | $\beta$ (deg.) | $\alpha$ (deg.) |
|---|---|---|---|
| 2.6 | 3.7 | 5.5 | +0.5 |
| 2.6 | 3.7 | 6.5 | +0.5 |
| 2.4 | 3.7 | 4.0 | +1.5 |
| 2.6 | 3.7 | 6.5 | −0.2 |
| 2.8 | 3.9 | 9.0 | +0.8 |

The important part played by the RF sputtered dielectric film in improving the overall device performance of the magnetic storage element is indicated. Even more importantly, however, is the great improvement effected by the RF sputtered film in stabilizing the magnetic parameters over the surface of the storage medium which in prior art devices is a major source of reliability problems.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a process for forming a magnetic film device, the steps of:
   - depositing a dielectric film over a substrate surface, said dielectric film being the product of a radio frequency sputtering process; and,
   - thereafter, depositing a ferromagnetic film over the dielectric film.

2. In a process for forming a magnetic film storage device of the type finding adaptation for storage and switching of intelligence in a computer, the steps of:
   - depositing a dielectric film over a metallic substrate surface, said dielectric film being the product of a radio frequency sputtering process; and,
   - thereafter, depositing a ferromagnetic film in the presence of an orienting field over said dielectric film, said ferromagnetic film having uniaxial anisotropy in the direction of the orienting field.

3. In a process for forming a magnetic film storage device of the type finding adaptation for the storage and switching of intelligence in a computer, the steps of:
   - depositing a metal film over the surface of a metallic substrate, said metal film being of the type that adheres to the substrate surface and forms an oxide compatible with the dielectric layer that is subsequently deposited;
   - depositing a dielectric film over the metal film, said dielectric film being the product of a radio frequency sputtering process; and,
   - thereafter, depositing a ferromagnetic film over the dielectric film, said ferromagnetic film being deposited in the presence of an orienting field, wherein said ferromagnetic film is characterized by uniaxial anisotropy in the direction of the orienting field and uniform magnetic properties over the surface thereof.

4. In a process for forming a ferromagnetic film storage device of the type finding adaptation for the storage and switching of intelligence in a computer, the steps of:
   - depositing a metal film over the surface of a metallic substrate, said metal film being of the type that adheres to the substrate surface and forms an oxide compatible with subsequent layers to be deposited;
   - depositing a dielectric film over the substrate surface, said dielectric film being the product of a radio frequency sputtering process, and, said film upon sputtering, condensing on said metallic film surface and adhering thereto; and,
   - thereafter, depositing a ferromagnetic film over the dielectric film, said ferromagnetic film being deposited in the presence of an orienting field to induce uniaxial anisotropy, and wherein said ferromagnetic film is characterized by uniform values of coercive force, anisotropy field, dispersion and skew.

5. A magnetic film storage device of the type finding adaptation for the storage and switching of intelligence in a computer comprising the combination of:
   - a base member;
   - a dielectric film superimposed over said substrate surface and adhering thereto, said dielectric film being the product of a radio frequency sputtering process; and,
   - a ferromagnetic film superimposed over said dielectric film, said ferromagnetic film having uniaxial anisotropy and uniform magnetic properties over the surface thereof.

6. A magnetic film storage device of the type finding adaptation for storage and switching of intelligence in a computer, comprising the combination of:
   - a metallic base member;
   - a metallic film superimposed over said metallic base member, said metallic film adhering to said base member and furnishing adhesive bonds for subsequent layers to be deposited;
   - a dielectric film superimposed over said metallic film layer, said dielectric film adhering to said metallic film and said dielectric film being the product of a radio frequency sputtering process;
   - a ferromagnetic film superimposed over said dielectric film, said ferromagnetic film having uniaxial anisotropy yielding an easy axis of magnetization, along which axis the magnetization is aligned; and,
   - means for reorienting the magnetization from one position along the easy axis to a second position in opposition to said first position and antiparallel thereto.

7. A magnetic film storage device of the type finding adaptation for the storage and switching of intelligence in a computer characterized by a ferromagnetic film surface having uniform magnetic properties thereover, the combination of:
   - a metallic base member;
   - a metal film superimposed over said metallic base member, said metal film adhering to said base member and furnishing the bonding fields for subsequent layers;

a dielectric film superimposed over said metal film, the dielectric film being the product of a radio frequency sputtering process;

a ferromagnetic film superimposed over said dielectric film having an easy axis of magnetization along which at least two stable states of magnetic remanence are available; and, means for reorienting the magnetic remanence from one of said stable states along the easy axis to the other of said stable states along said easy axis, said means including at least two sets of drive lines and said drive lines being in quadrature one to the other.

References Cited

UNITED STATES PATENTS

| | | | |
|---|---|---|---|
| 3,336,211 | 8/1967 | Mayer | 204—192 |
| 3,303,116 | 2/1967 | Maissel et al. | 204—192 |
| 3,161,946 | 12/1964 | Birkenbeil | 29—155.5 |
| 3,077,444 | 2/1963 | Hoh | 204—192 |

JAMES W. MOFFITT, Primary Examiner

U.S. Cl. X.R.

204—192, 298